United States Patent
Yu (10) Patent No.: US 9,287,933 B2
(45) Date of Patent: Mar. 15, 2016

(54) APPARATUS FOR POWER LINE COMMUNICATION

(71) Applicant: LSIS CO., LTD., Anyang-si, Gyeonggi-do (KR)

(72) Inventor: Young Gyu Yu, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 14/570,805

(22) Filed: Dec. 15, 2014

(65) Prior Publication Data

US 2015/0180541 A1  Jun. 25, 2015

(30) Foreign Application Priority Data

Dec. 19, 2013  (KR) .................. 10-2013-0159524

(51) Int. Cl.
*H04B 3/54* (2006.01)
*H04B 3/56* (2006.01)
*H04L 5/00* (2006.01)

(52) U.S. Cl.
CPC .............. *H04B 3/542* (2013.01); *H04B 3/56* (2013.01); *H04L 5/0005* (2013.01); *H04B 2203/542* (2013.01); *H04B 2203/5466* (2013.01); *H04B 2203/5483* (2013.01)

(58) Field of Classification Search
USPC ....................... 375/257; 307/89, 40
See application file for complete search history.

(56) References Cited

U.S. PATENT DOCUMENTS

| | | | | |
|---|---|---|---|---|
| 5,963,021 | A  * | 10/1999 | Rostron et al. | 323/210 |
| 7,170,395 | B2 * | 1/2007 | Crenshaw et al. | 340/12.32 |
| 2002/0041228 | A1* | 4/2002 | Zhang | 340/310.01 |
| 2003/0197426 | A1* | 10/2003 | Carson et al. | 307/40 |
| 2008/0185917 | A1* | 8/2008 | Carroll | 307/89 |
| 2009/0134699 | A1 | 5/2009 | Choi et al. | |
| 2011/0026621 | A1 | 2/2011 | Kim et al. | |
| 2013/0215981 | A1* | 8/2013 | Fornage | 375/257 |

OTHER PUBLICATIONS

European Patent Office Application Serial No. 14197169.7, Search Report dated Apr. 20, 2015, 6 pages.

* cited by examiner

*Primary Examiner* — Eva Puente
(74) *Attorney, Agent, or Firm* — Lee, Hong, Degerman, Kang & Waimey (57) ABSTRACT

Disclosed is an apparatus for power line communication. More specifically, in order to solve a problem of the conventional art, in which the magnitude of power line communication signals exceeds a reference value allowed in the law, the apparatus controls a communication signal to be selectively output a communication target phase among phases of a three-phase power line. Accordingly, it is possible to maintain the magnitude of the output communication signal to be low. Further, it is possible to reduce distortion of a power signal, caused by the communication signal, and malfunction of other power facilities due to the distortion. Further it is possible to easily and simply perform initiation of the power line communication.

6 Claims, 7 Drawing Sheets

APPARATUS FOR POWER LINE COMMUNICATION

CROSS-REFERENCE TO RELATED APPLICATIONS

Pursuant to 35 U.S.C. §119(a), this application claims the benefit of earlier filing date and right of priority to Korean Application No. 10-2013-0159524, filed on Dec. 19, 2013, the contents of which is incorporated by reference herein in its entirety.

BACKGROUND OF THE DISCLOSURE

1. Field of the Disclosure

The present disclosure relates to an apparatus for power line communication, and particularly, to an apparatus for power line communication, in which a communication signal is selectively output to a communication target phase among phases of a three-phase power line.

2. Description of the Background Art

Power line communication has advantages of low investment costs in view of using existing power lines without installation of another communication line, and simplified communication by connecting a plug into a socket installed on a wall. Therefore, the power line communication is considered as the most appropriate medium in various types of fields, such as home networking, home automation, remote metering, and factory automation. Particularly, remote metering using the power line communication is a technique preferred by electric power companies, in which power meter data of all consumers connected to electric wiring are metered by installing at a secondary pole transformer.

Figure 1:
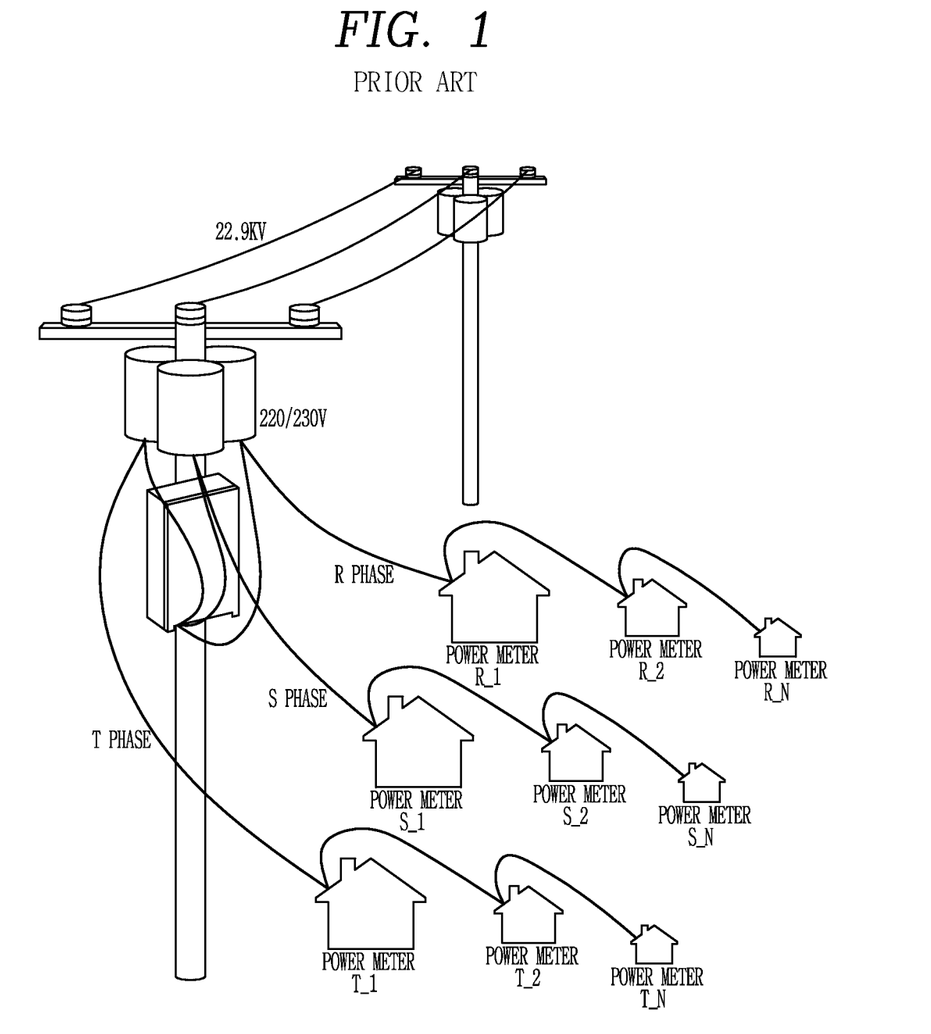
FIG. 1 is a configuration view showing remote metering using conventional power line communication.

FIG. 1 is a configuration view showing remote metering using conventional power line communication.

Figure 2:
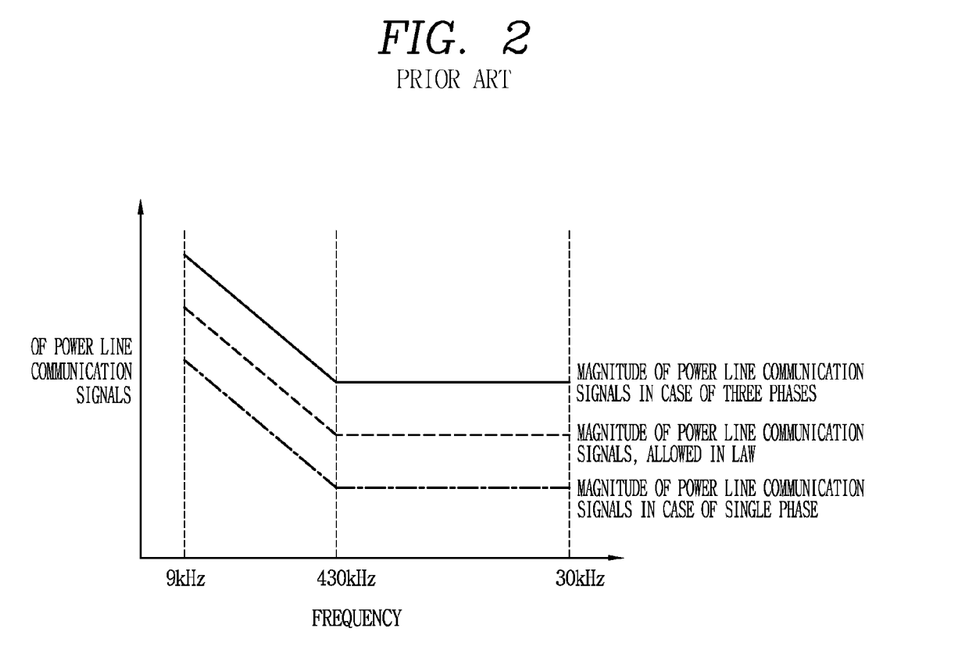
FIG. 2 is a graph showing the amplitude of signals in the conventional power line communication.

FIG. 2 is a graph showing the amplitude of signals in the conventional power line communication.

As shown in FIG. 1, in the configuration of the remote metering using the conventional power line communication, a concentrator is installed at a secondary pole transformer and connected to a power source circuit in three phases, i.e., R, S and T phases to receive power for the purpose of the power line communication. The power of the R, S and T phases of the secondary pole transformer is applied to each consumer. An analog processor of a power line communication modem should support outputs of the three phases so that the power line communication modem applies a power line signal to each of the R, S and T phases.

Most power line communication modems are designed based on a single phase and designed to have the magnitude of power line signals, slightly lower than a reference value allowed in the law, in consideration of a variation between products, and the like. If the modem designed based on the single phase is applied to the three phases without any correction, the output driving performance of the analog processor is insufficient, and therefore, the communication performance of the modem is deteriorated. In order to prevent the deterioration of the communication performance, if the output of the analog processor is designed to be three times greater than that based on the single phase, the communication performance is improved, but the magnitude of power line communication signals exceeds the reference value allowed in the law. FIG. 2 shows a problem in that, in the case of three-phases, the magnitude of power line communication signals exceeds the reference value allowed in the law.

SUMMARY OF THE DISCLOSURE

Therefore, an aspect of the detailed description is to provide an apparatus for power line communication, which controls a communication signal to be selectively output to a communication target phase in three-phase power line communication, thereby maintaining the magnitude of the output communication signal to be low.

To achieve these and other advantages and in accordance with the purpose of this specification, as embodied and broadly described herein, an apparatus for power line communication, the apparatus includes: a connector connected to each phase of a three-phase power line, so that a communication signal transmitted to a communication target device provided to each phase is transferred thereto; and a controller configured to output the communication signal and control the connector, wherein the controller controls the connector so that the communication signal is output to any one or more selected from the phases.

In one exemplary embodiment, the connector may include a coupling transformer configured to convert the communication signal output from the controller into a form capable of being transferred to the three-phase power line; and a coupling capacitor configured to convert the communication signal into a form capable of being transferred to each phase.

In one exemplary embodiment, the controller may include an analog communication unit configured to output the communication signal; and a digital communication unit configured to convert the communication signal into a digital signal and control the connector.

In one exemplary embodiment, the controller may further include a zero cross detector configured to detect a phase of each phase using a zero cross principle.

In one exemplary embodiment, the controller may control the connector to detect a phase of each phase using the zero cross detector and distinguish a phase to which the communication target device is provided based on the detected phase, so that the communication signal is output to any one or more of the phases, to which the communication target device is provided.

In one exemplary embodiment, the controller may further include a storage unit configured to store information where the phase having the communication target device provided thereto is distinguished.

In one exemplary embodiment, the connector 10 may include a switch 13 connected to each phase. The controller may control the switches so that the communication signal is output to any one or more selected from the phases through opening/closing of the switches.

In one exemplary embodiment, the apparatus may simultaneously communicate with the plurality of communication target devices provided to the respective phases.

The apparatus according to the present disclosure controls a communication signal to be selectively output to a communication target phase in three-phase power line communication, thereby maintaining the magnitude of the output communication signal to be low.

The apparatus according to the present disclosure controls a communication signal to be selectively output to a communication target phase, thereby reducing distortion of a power signal, caused by the communication signal, and malfunction of other power facilities due to the distortion.

The apparatus according to the present disclosure automatically distinguishes each phase of the three-phase power line through the zero cross detection principle, thereby easily and simply performing initiation of the power line communication.

The apparatus according to the present disclosure stores information a phase to which a communication target device is provided through distinguishment of each phase and performs communication through the stored information, thereby performing flexible application and wide use in the power line communication.

The apparatus according to the present disclosure controls the opening/closing of a switch connected to each phase of the three-phase power line. Accordingly, the apparatus operates like one designed based on a single phase, thereby reducing power consumption of the apparatus. Further, the distinguishment and separation of each communication target phase are possible, thereby easily performing maintenance, replacement and examination of devices, communication lines and power lines, installed in the apparatus.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

The present disclosure may be applied to an apparatus for power line communication. However, the present disclosure is not limited thereto, and may be applied to all existing apparatus and systems for power line communication to which the technical spirit of the present disclosure is applicable. Particularly, the present disclosure can be applied and embodied in remote metering through power line communication.

First, the configuration of an apparatus for power line communication according to the present disclosure will be described with reference to FIG. 3.

Figure 3:
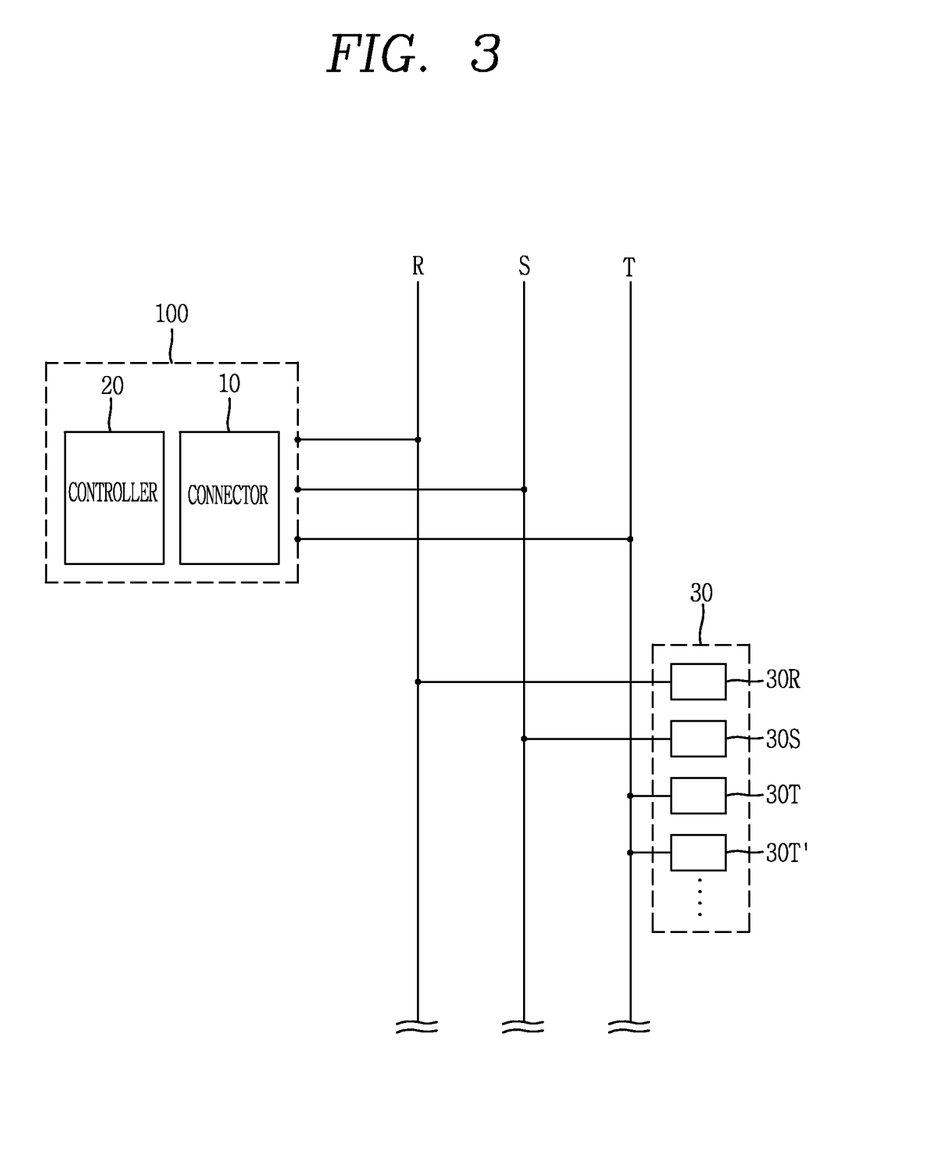
FIG. 3 is a configuration view an apparatus for power line communication according to the present disclosure.

FIG. 3 is a configuration view an apparatus for power line communication according to the present disclosure.

As shown in FIG. 3, the apparatus (100) includes a connector (10) connected to each phase of a three-phase power line, so that a communication signal transmitted to a communication target device (30) provided to each phase is transferred thereto, and a controller (20) for outputting the communication signal and controlling the connector (10). The controller (20) controls the connector (10) so that the communication signal is output to any one or more selected from the phases.

The power line communication means a power line communication (PLC) scheme in which communication is performed through existing power lines without installation of another communication line. The apparatus (100) means an apparatus that enables the PLC scheme.

The apparatus (100) is connected to each phase of the three-phase power line, to apply or extract the communication signal to or from the three-phase power line, thereby performing transmission/reception of the communication signal. More specifically, the apparatus (100) directly applied or extract the communication signal to or from a sine wave power signal (60 Hz) flowing in the three-phase power line, to transmit the communication signal in a form combined with the power signal, thereby performing communication through the power line.

The three-phase power line may be a line of a three-phase distribution scheme, which is composed of R, S and T phases.

The three-phase power line may be a line of a three-phase three-line type, which is composed of R, S and T phases.

The three-phase power line may be a line of a three-phase four-line type, which is composed of R, S and T phases and further includes an N phase as a neutral line.

The communication target device (30) is a device for performing communication with the apparatus (100). The communication target device (30) may be a device including a power line communication modem capable of applying or extracting the communication signal to or from the three-phase power line.

The communication target device (30) may be provided to each phase of the three-phase power line.

For example, as shown in FIG. 3, the communication target devices (30R, 30S and 30T) may be provided to the respective R, S and T phases.

The apparatus (100) is connected to the three-phase power line through the connector (10).

The connector (10) is connected to each of the R, S and T phases, to allow the communication signal to be transferred to the three-phase power line.

The communication signal transferred through the connector (10) is combined with the power signal flowing in the three-phase power line and then transferred to the communication target device (30) provided to each phase.

The controller (20) outputs the communication signal and controls the connector 10.

The controller (20) outputs the communication signal so that the communication signal is in a form combined with the power signal and then transferred to the communication target device through the three-phase power line.

The controller (20) controls the connector so that the output communication signal is transferred to the three-phase power line.

For example, after the communication signal is output to be in the form combined with the power signal and then transferred to the communication target device through the three-phase power line, the controller (20) may control the connector (10) so that the output communication signal is transferred to the three-phase power line through the connector (10).

The communication signal transferred to the three-phase power line through the connector (10) is combined with the power signal flowing in the three-phase power line and then transferred to the communication target device (30).

The communication target device (30) detects the communication signal combined with the power signal through the power line communication modem included therein, thereby receiving the communication signal.

The communication target device (30) may transmit a response signal with respect to the received communication signal through the power line communication modem.

The output of the response signal may be made through the power line communication modem, and the response signal may be output in the same manner as the apparatus (100).

Hereinafter, an exemplary embodiment of the apparatus (100) according to the present disclosure will be described with reference to FIG. 4.

Figure 4:
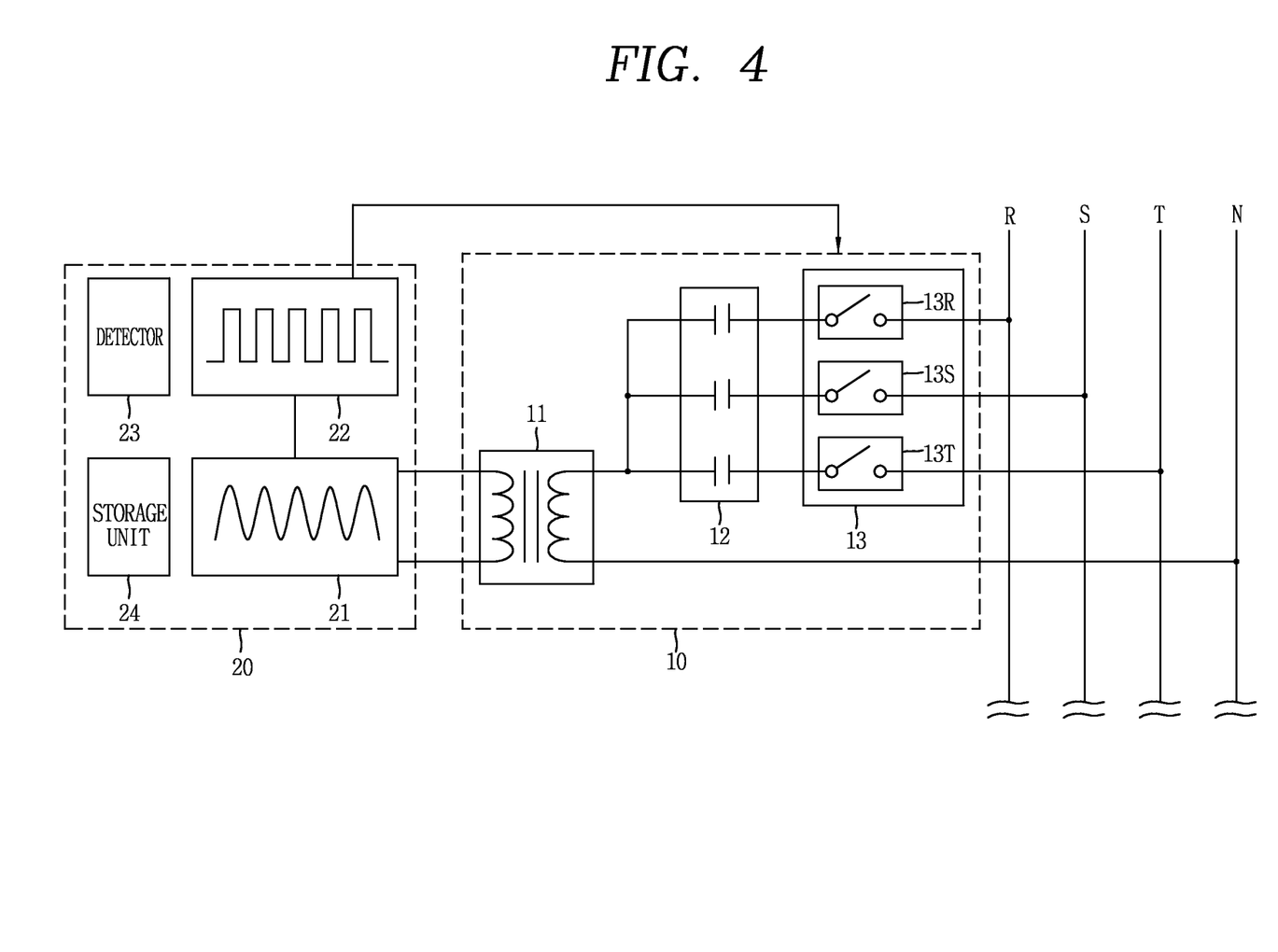
FIG. 4 is a configuration view showing an exemplary embodiment of the apparatus according to the present disclosure.

FIG. 4 is a configuration view showing an exemplary embodiment of the apparatus according to the present disclosure.

As shown in FIG. 4, the apparatus (100) includes the connector (10) connected to each phase of a three-phase power line, so that a communication signal transmitted to a communication target device (30) provided to each phase is transferred thereto, and the controller (20) for outputting the communication signal and controlling the connector (10) so that the communication signal is output to any one or more selected from the phases. The connector (10) may include a coupling transformer (11) for converting the communication signal output from the controller (20) into a form capable of being transferred to the three-phase power line, and a coupling capacitor (12) for converting the communication signal into a form capable of being transferred to each phase.

The coupling transformer (11) converts the output communication signal into a form capable of being transferred to the three-phase power line, so that the communication signal can be coupled to the power signal.

The coupling capacitor (12) converts the communication signal into a form capable of being transferred to each phase, so that the communication signal is coupled to the power signal flowing in each phase.

That is, the communication signal is converted into an output amplitude and form capable of being transferred to the three-phase power line in the coupling transformer (11), and converted into a form capable of being transferred to each phase in the coupling capacitor (12), to be coupled to the power signal.

The coupling transformer (11) and the coupling capacitor (12) convert the communication signal into a form capable of being coupled to the power signal flowing in the three-phase power line by filtering harmonic and DC components of the communication signal.

The controller (20) may include an analog communication unit (21) for outputting the communication signal, and a digital communication unit (22) for converting the communication signal into a digital signal and controlling the connector (10).

The analog communication unit (21) may output the communication signal as an AC analog signal so that the communication signal can be coupled to the power signal that is an AC signal.

The analog communication unit (21) is connected to the connector (10), to output the communication signal as an analog signal.

The digital communication unit (22) is connected to the analog communication unit (21), to convert the communication signal transmitted/received to/from the analog communication unit (21) into a digital form and to control the connector (10).

That is, the analog communication unit (21) and the digital communication unit (22) may convert the communication signal into analog and digital signals.

The digital communication unit (22) may control the connector (10) so that the communication signal can be coupled to the power signal.

That is, the digital communication unit (22) may control the connector (10) so that the communication signal can be converted into a form capable of being coupled to the power signal.

The controller (20) may further include a zero cross detector (23) for detecting a phase of each phase using a zero cross principle.

The zero cross detector (23) may detect a phase of the phase to which the communication target device (30) is provided, based on a signal transmitted from the communication target device (30) provided to each phase.

Hereinafter, the zero cross detection principle of the zero cross detector in the apparatus according to the present disclosure will be described with reference to FIGS. 5 and 6.

Figure 5:
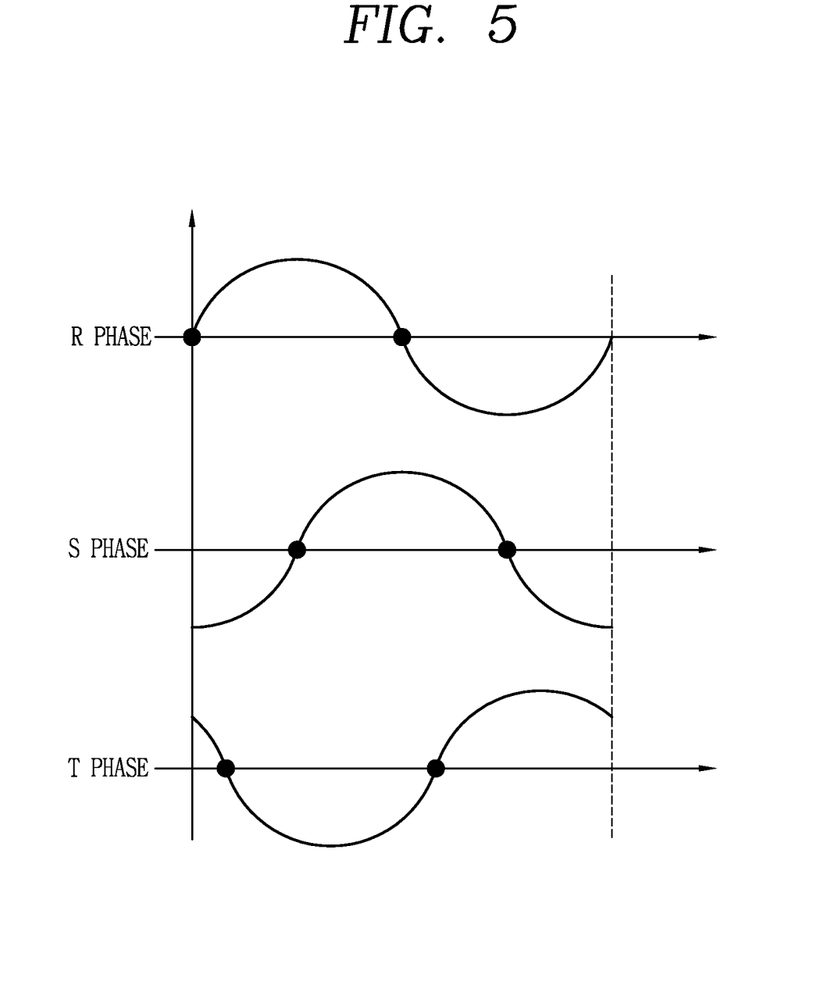
FIG. 5 is a graph 1 showing a detection principle of a zero cross detector in the apparatus according to the exemplary embodiment of the present disclosure.

FIG. 5 is a graph 1 showing the detection principle of the zero cross detector in the apparatus according to the exemplary embodiment of the present disclosure.

Figure 6:
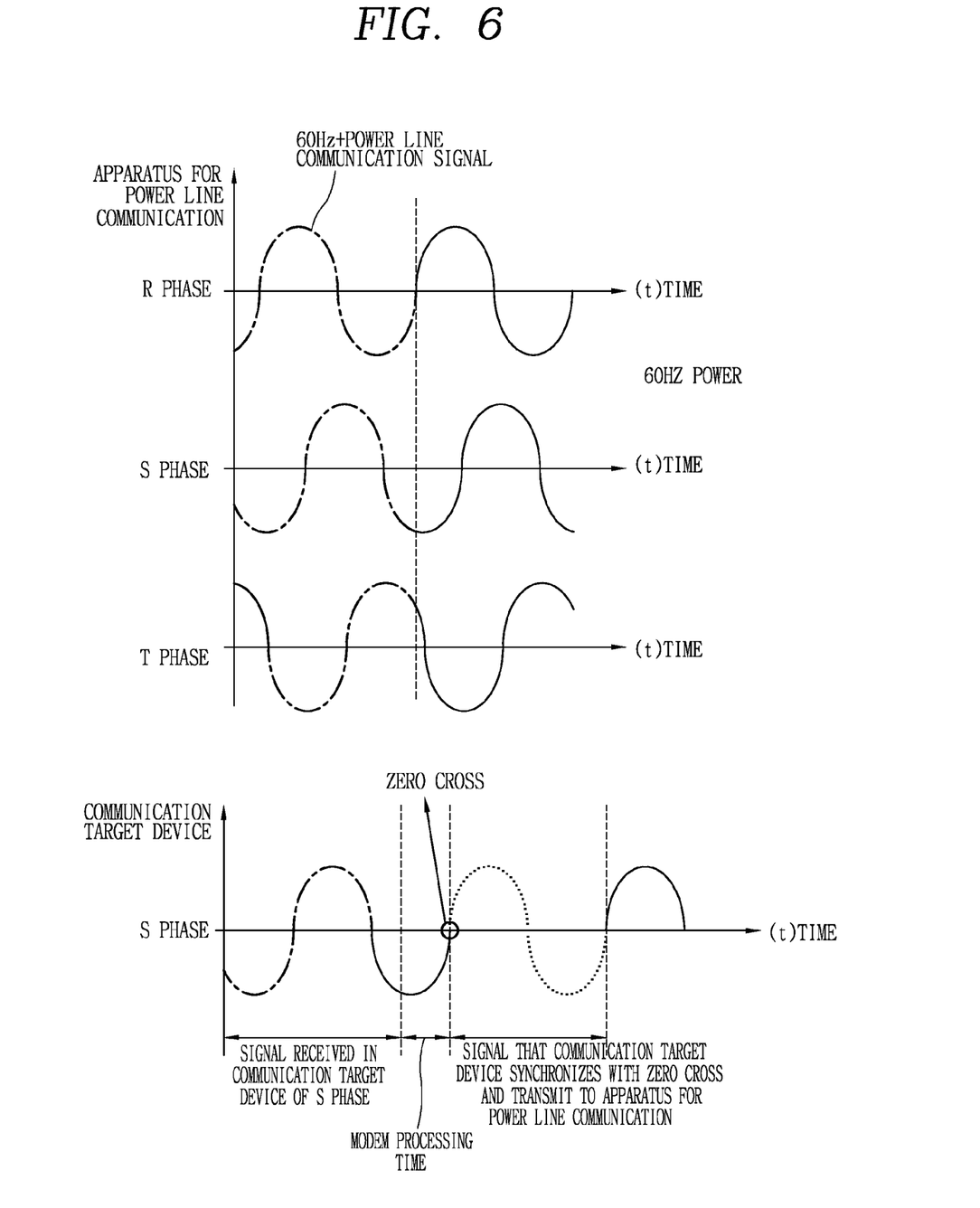
FIG. 6 is a graph 2 showing the detection principle of the zero cross detector in the apparatus according to the exemplary embodiment of the present disclosure.

FIG. 6 is a graph 2 showing the detection principle of the zero cross detector in the apparatus according to the exemplary embodiment of the present disclosure.

As shown in FIG. 5, the zero cross detector (23) detects a point at which the magnitude of a signal is 0, based on a phase difference of 120 degrees between each two of the R, S and T phases.

In the R phase, the magnitude of the signal becomes 0 at a phase of 0 degree. In the S phase, the magnitude of the signal becomes 0 at a phase of 120 degrees. In the T phase, the magnitude of the signal becomes 0 at a phase of 240 degrees. Thus, if a point at which the magnitude of the signal is 0 is detected, each phase can be distinguished based on the detected point.

The zero cross detector (23) can detect and distinguish a phase to which the communication target device (30) is provided using the principle described above.

For example, the power signals flowing in the respective R, S and T phases have a phase difference of 120 degrees. Thus, if a point at which the magnitude of a signal received in the apparatus (100) is 0, the phase of any one of the R, S and T phases can be distinguished based on the detected point. Accordingly, it can be seen which phase among the R, S and T phases the received signal is transmitted from.

In order to detect information of a phase to which the communication target device (30) is provided, the zero cross detector (23) may apply the communication signal to the communication target device (30) provided to each phase.

For example, as shown in FIG. 6, if the communication target device (30) is provided to the S phase, the communication target device (30) synchronizes a response signal with respect to the S phase with a zero cross of the S phase and transmits the synchronized signal to the apparatus (100). The zero cross detector (23) detects a point at which the magnitude of the received signal is 0, and recognizes that the received signal is a signal received in the S phase. Accordingly, it can be recognized that the communication target device (30) is provided to the S phase.

The zero cross detector (23) repeatedly performs this process in initial installation, so that it is possible to recognize information of phases to which all the communication target devices (30) installed in the three-phase power line are provided.

The controller (20) detects a phase of each phase using the zero cross detector (23), and distinguishes a phase to which the communication target device (30) is provided based on the detected phase. Thus, the controller (20) can control the connector (10) so that the communication signal is output to any one or more phases among the phases, to which the communication target device (30) is provided based on the distinguished phase.

The controller (20) may further include a storage unit (24) for storing information in which the phase having the communication target device (30) provided thereto is distinguished.

That is, the controller (20) may distinguish a phase to which the communication target device (30) is provided through the zero cross detector (23), and store, in the storage unit (24), information where the phase having the communication target device (30) provided thereto is distinguished. The controller (20) may control the connector (10) so that the communication signal is output to the communication target device (30) based on the information in the storage unit (24).

For example, when the communication signal is output to the communication target device (30) provided to the R phase, the controller (20) may control the connector (10) so that the communication signal is output to the R phase, based on information that the communication target device (30) detected through the zero cross detector (23) has been provided to the R phase.

Alternatively, when the communication signal is output to the communication target device (30) provided to the R and S phases, the controller (20) may control the connector (10) so that the communication signal is output to the R and S phases, based on information that the communication target device (30) detected through the zero cross detector (23) has been provided to the R and S phases.

That is, the controller (20) may control the connector (10) so that the communication signal is selectively output to the phase to which the communication target device (30) is provided among the phases.

The connector (10) may include a switch (13) connected to each phase, and the controller (20) may control the switches (13) so that the communication signal is output to any one or more selected from the phases through opening/closing of the switches (13).

That is, the controller (20) controls the opening/closing of the switches (13) included in the connector (10), so that the communication signal can be selectively output to the phase to which the communication target device (30) is provided among the phases.

For example, when the communication target device (30) is provided to the R phase, the S and T phases is irrelevant to whether the communication signal is output. Therefore, the controller (20) may control switches (13S and 13T) connected to the respective S and T phases to be opened and control a switch (13R) connected to the R phase to be closed, so that the communication signal can be selectively output to the R phase.

Alternatively, when the communication target device (30) is provided to the R and S phases, the T phase is irrelevant to whether the communication signal is output. Therefore, the controller (20) may control the switch (13T) connected to the T phase to be opened and control the switches (13R and 13S) connected to the respective R and S phases to be closed, so that the communication signal can be selectively output to the R and S phases.

Alternative, when the communication target device (30) are provided to all the R, S and T phases, the communication signal is necessarily output to each phase. Therefore, the controller (20) may control the switch (13) connected to each phase to be closed, so that the communication signal can be output to each phase.

Figure 7:
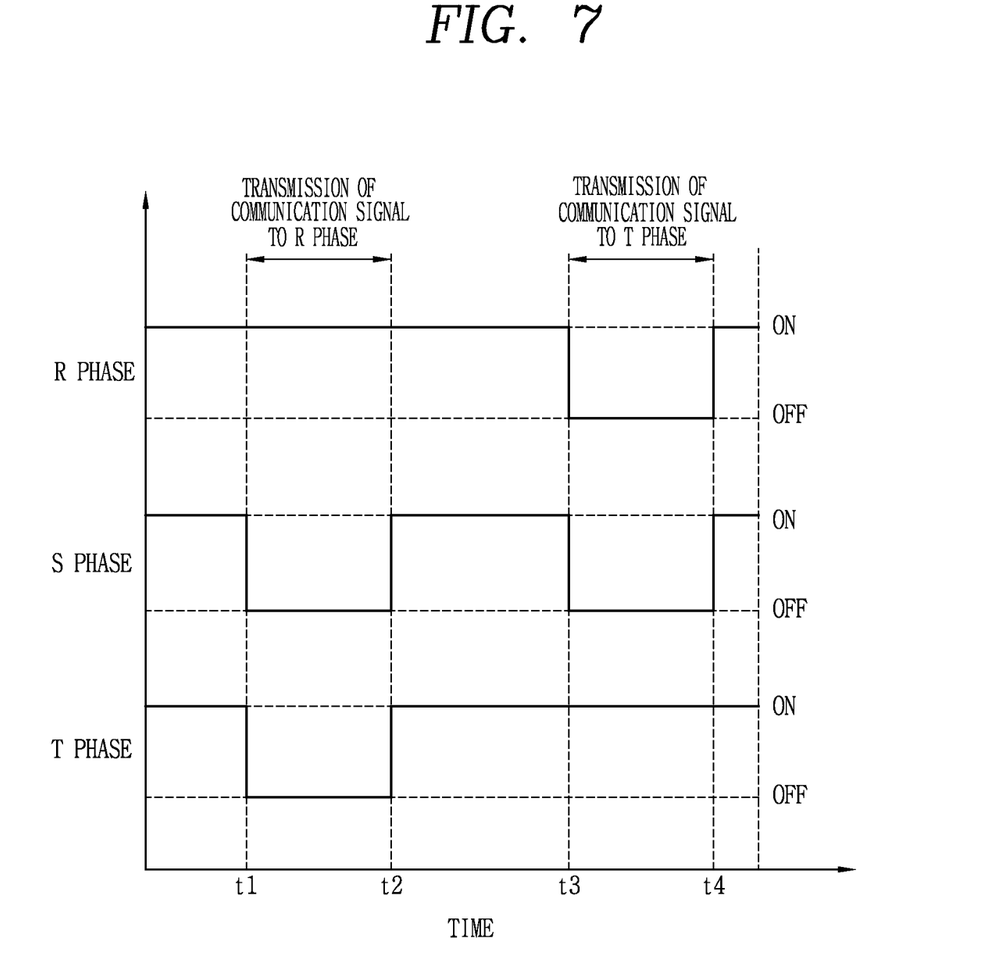
FIG. 7 is a graph showing switch control in the apparatus according to the exemplary embodiment of the present disclosure.

FIG. 7 is a graph showing switch control in the apparatus according to the exemplary embodiment of the present disclosure.

Referring to FIG. 7, for example, during a period from t1 to t2 when the communication signal is output to the R phase, the switch (13R) of the R phase may be closed, and the switches (13S and 13T) of the S and T phases may be opened.

During a period from t2 to t3 after the communication signal is output to the R phase, the opened switches (13S and 13T) of the S and T phases may be closed to be restored.

During a period from t3 to t4 when the communication signal is output to the T phase, the switches (13R and 13S) of the R and S phases may be opened, and the switch (13T) of the T phase may be closed.

That is, the switch connected to the phase to which the communication target device (30) is provided is closed, and the switches connected to the other phases except the phase to which the communication target device is provided are opened, so that the communication signal can be selectively output to any one or more phases among the phases.

The apparatus (100) may simultaneously communicate with the plurality of communication target devices (30) provided to the respective phases.

For example, the communication signal may be simultaneously output to the communication target device provided to the R phase and the communication target device provided to the S phase.

Alternatively, the communication signal may be simultaneously output to the plurality of communication target devices provided to the respective phases.

The apparatus (100) may perform remote metering through communication with the communication target device (30) provided to each phase.

For example, the apparatus (100) may perform communication with a plurality of metering devices provided to the respective phases and perform remote metering by receiving metering data transmitted from the metering devices.

The exemplary embodiments of the apparatus according to the present disclosure may be applied and embodied in apparatus and systems for power line communication using power lines.

The exemplary embodiments of the apparatus according to the present disclosure may be applied and embodied in apparatus and systems for remote metering using power line communication.

The exemplary embodiments of the apparatus according to the present disclosure may be applied and embodied in communication apparatus and systems of power transmitters and power distributors including three-phase power lines.

The exemplary embodiments of the apparatus according to the present disclosure may be applied and embodied in communication apparatus and systems of power generators and power transformers including three-phase power lines.

The exemplary embodiments of the apparatus according to the present disclosure may be applied and embodied in power distribution of a three-phase three-line type and power distribution of a three-phase four-line type.

The exemplary embodiments of the apparatus according to the present disclosure may be applied and embodied in communication apparatus and systems of buildings, factories, large-sized plants and power receiving facilities, in which three-phase power is received.

The apparatus according to the present disclosure controls a communication signal to be selectively output to a communication target phase in three-phase power line communication, thereby maintaining the magnitude of the output communication signal to be low.

The apparatus according to the present disclosure controls a communication signal to be selectively output to a communication target phase, thereby reducing distortion of a power signal, caused by the communication signal, and malfunction of other power facilities due to the distortion.

The apparatus according to the present disclosure automatically distinguishes each phase of the three-phase power line through the zero cross detection principle, thereby easily and simply performing initiation of the power line communication.

The apparatus according to the present disclosure stores information a phase to which a communication target device is provided through distinguishment of each phase and performs communication through the stored information, thereby performing flexible application and wide use in the power line communication.

The apparatus according to the present disclosure controls the opening/closing of a switch connected to each phase of the three-phase power line. Accordingly, the apparatus operates like one designed based on a single phase, thereby reducing power consumption of the apparatus. Further, the distinguishment and separation of each communication target phase are possible, thereby easily performing maintenance, replacement and examination of devices, communication lines and power lines, installed in the apparatus.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An apparatus for three-phase power line communication, the apparatus comprising:
    a connector connected to each phase of a three-phase power line, so that a communication signal transmitted to a communication target device provided to each phase is transferred thereto; and
    a controller configured to output the communication signal and control the connector,
    wherein the connector includes:
    a coupling transformer configured to convert the communication signal output from the controller into a form capable of being transferred to the three-phase power line; and
    a coupling capacitor configured to convert the communication signal into a form capable of being transferred to each phase,
    wherein the controller is further configured to control the connector such that the communication signal is selectively transmitted to at least one phase of each phase of the three-phase power line, and
    wherein the controller includes a zero cross detector configured to detect a phase of each phase using a zero cross principle.

2. The apparatus of claim 1, wherein the controller further includes:
    an analog communication unit configured to output the communication signal; and
    a digital communication unit configured to convert the communication signal into a digital signal and control the connector.

3. The apparatus of claim 1, wherein the controller is further configured to control the connector to detect a phase of each phase using the zero cross detector and distinguish a phase to which the communication target device is provided based on the detected phase, such that the communication signal is selectively transmitted to at least one phase of each phase of the three-phase power line, to which the communication target device is provided.

4. The apparatus of claim 1, wherein the connector includes a switch connected to each phase, and
    wherein the controller is further configured to control the switches such that the communication signal is selectively transmitted to at least one phase of each phase of the three-phase power line.

5. The apparatus of claim 1, wherein the apparatus simultaneously communicates with the communication target devices provided to the phases.

6. The apparatus of claim 3, wherein the controller further includes a storage unit configured to store information where the phase having the communication target device provided thereto is distinguished.

* * * * *